(12) United States Patent
Wu et al.

(10) Patent No.: US 12,349,721 B2
(45) Date of Patent: Jul. 8, 2025

(54) TOBACCO FLAVORING MACHINE

(71) Applicant: XIAMEN TOBACCO INDUSTRIAL CO., LTD., Xiamen (CN)

(72) Inventors: Yusheng Wu, Xiamen (CN); Yuefei Zhou, Xiamen (CN); Zhu Shao, Xiamen (CN); Daoquan Wang, Xiamen (CN); Guozhong Wu, Xiamen (CN); Wenliang Dong, Xiamen (CN)

(73) Assignee: XIAMEN TOBACCO INDUSTRIAL CO., LTD., Xiamen (CN)

( * ) Notice: Subject to any disclaimer, the term of this patent is extended or adjusted under 35 U.S.C. 154(b) by 574 days.

(21) Appl. No.: 17/535,958

(22) Filed: Nov. 26, 2021

(65) Prior Publication Data

US 2022/0167655 A1    Jun. 2, 2022

(30) Foreign Application Priority Data

Nov. 30, 2020   (CN) .......................... 202011369316.X (51) Int. Cl.
| | |
|---|---|
| *A24B 3/12* | (2006.01) |
| *A24B 3/06* | (2006.01) |
| *B05B 13/02* | (2006.01) |
| *B05B 15/16* | (2018.01) |
| *B65G 31/04* | (2006.01) |

(52) U.S. Cl.
CPC ................... *A24B 3/12* (2013.01); *A24B 3/06* (2013.01); *B05B 13/0257* (2013.01); *B05B 15/16* (2018.02); *B65G 31/04* (2013.01)

(58) Field of Classification Search
None
See application file for complete search history.

(56) References Cited

U.S. PATENT DOCUMENTS 3,227,789 A * 1/1966 Tytus .......................... B01J 2/16
                                                                    425/222
3,258,253 A * 6/1966 Brown, Jr. .............. B01F 29/61
                                                                      366/2

(Continued)

FOREIGN PATENT DOCUMENTS

| CN | 204317473 | 5/2015 |
|---|---|---|
| CN | 209121274 | 7/2019 |

(Continued)

OTHER PUBLICATIONS

Chinese Patent Application No. 202011369316.X , First Office Action, dispatched Jun. 20, 2024.

*Primary Examiner* — Binu Thomas
(74) *Attorney, Agent, or Firm* — Dorsey & Whitney LLP (57) ABSTRACT

The present disclosure relates to a tobacco flavoring machine, comprising: a drum (1) capable of rotating about an axis thereof as a rotation center; a nozzle (6) disposed in the drum (1) to spray a liquid flavor to tobacco shreds in the drum (1); and a shoveling plate (5) arranged on an inner wall (11) of the drum (1) and extending from an inlet end of the drum (1) towards the interior of the drum (1), the shoveling plate (5) being disposed obliquely with respect to a generatrix (9) of the drum (1). The present disclosure improves the problem of the related art that tobacco shreds cannot flow smoothly from an inlet end toward an outlet end because a shoveling plate (5) is parallel to an axis of a drum (1).

7 Claims, 4 Drawing Sheets

(56) References Cited

U.S. PATENT DOCUMENTS

| | | | | |
|---|---|---|---|---|
| 4,430,003 | A * | 2/1984 | Beattie | B05B 13/0257 |
| | | | | 366/175.3 |
| 4,478,171 | A * | 10/1984 | Bridges | B01J 2/12 |
| | | | | 264/117 |
| 5,443,637 | A * | 8/1995 | Long, Jr. | B01J 2/006 |
| | | | | 118/313 |
| 6,318,112 | B1 * | 11/2001 | Lennox, III | A23G 3/26 |
| | | | | 366/147 |
| 6,451,115 | B1 * | 9/2002 | Wilson | B05B 13/0257 |
| | | | | 118/19 |
| 7,198,897 | B2 | 4/2007 | Wangh et al. | |
| 7,670,810 | B2 | 3/2010 | Gunderson et al. | |
| 2006/0096527 | A1 * | 5/2006 | Hasegawa | B05B 13/0257 |
| | | | | 118/19 |
| 2015/0047657 | A1 * | 2/2015 | Wu | A24B 3/04 |
| | | | | 131/306 |

FOREIGN PATENT DOCUMENTS

| | | | |
|---|---|---|---|
| CN | 111515158 | | 8/2020 |
| CN | 111700300 A | * | 9/2020 |
| CN | 216533783 | | 5/2022 |

* cited by examiner

TOBACCO FLAVORING MACHINE

CROSS-REFERENCE TO RELATED APPLICATION

This disclosure is based on and claims the priority to the Chinese patent application No. 202011369316.X filed on Nov. 30, 2020, the disclosure of which is hereby incorporated by reference in its entirety into the present application

FIELD OF THE DISCLOSURE

The present disclosure relates to the field of tobacco processing, specifically to a tobacco flavoring machine.

BACKGROUND OF THE DISCLOSURE

Flavoring is one of the core processes of cigarette processing. The task of the process is to apply a liquid flavor accurately and uniformly to tobacco shreds according the requirement of product design, and to enable the tobacco shreds to absorb the liquid flavor stably. Flavoring of tobacco shreds achieves auxiliary, stabilizing, supplementary, aromatic and taste-modifying effects on cigarette products and bring different style characteristics to the cigarette products to satisfy different personalized needs of consumers, thereby being favored by the consumers. This process is directly related to the sensory quality of the cigarette products, and is a key process for realizing the product value and improving the product grade.

Figure 1:
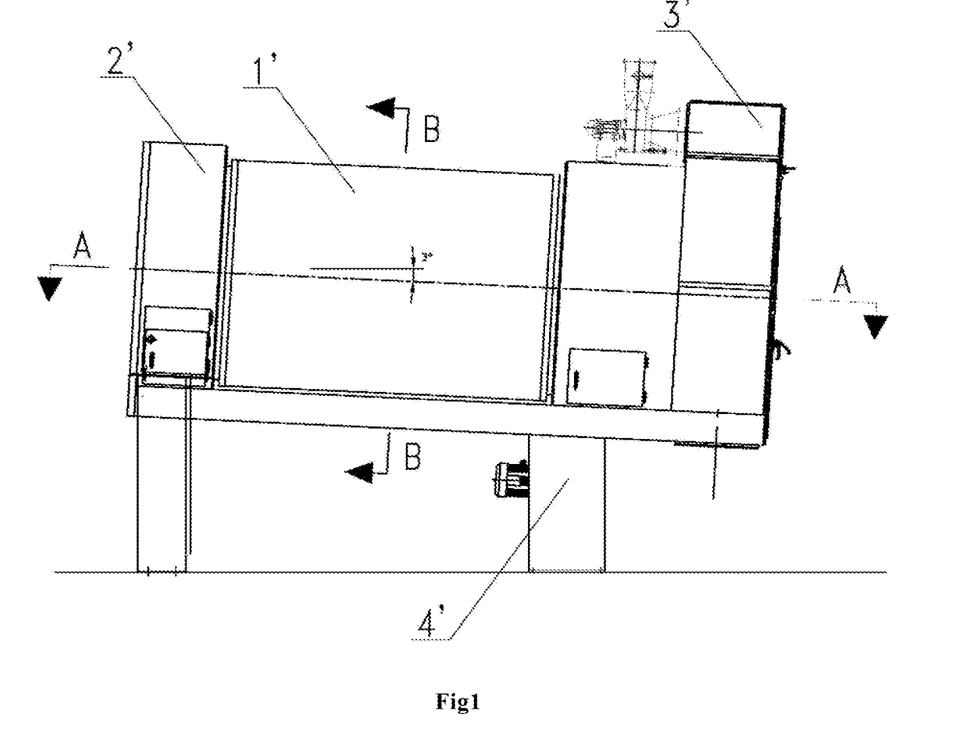
FIG. 1 shows a schematic structural diagram of a tobacco flavoring machine of the related art.
Figure 2:
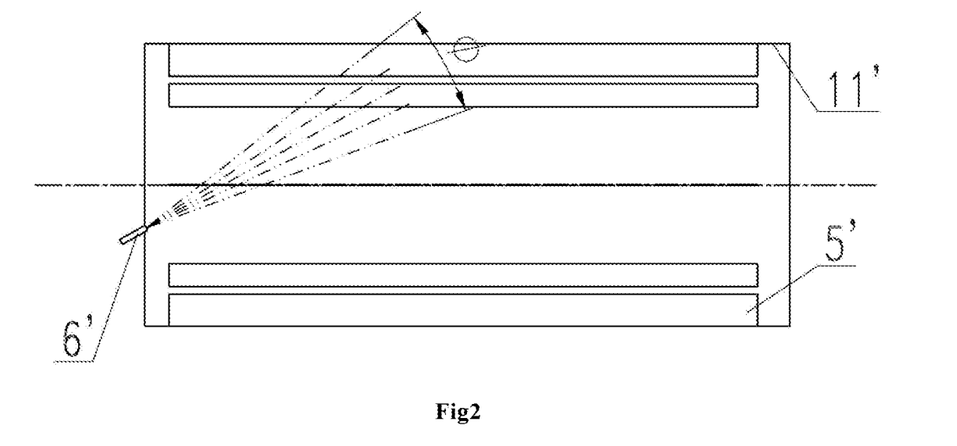
FIG. 2 shows a schematic sectional diagram of the tobacco flavoring machine of FIG. 1 at A-A.
Figure 3:
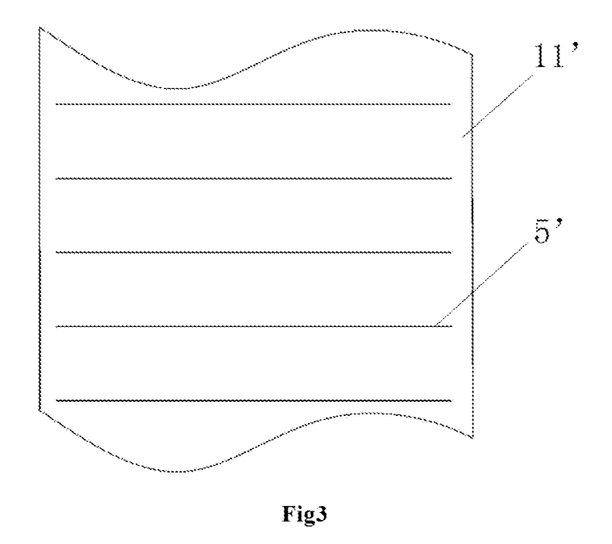
FIG. 3 shows an internal deployed diagram of a drum of the tobacco flavoring machine of FIG. 1.

As shown in FIGS. 1 to 3, a tobacco flavoring mechanism of the related art includes a material shoveling device and a spraying device 6', wherein the material shoveling device includes a drum 1', a feed part 2' located at a feed end of the drum 1', a discharge part 3' located at a discharge end of the drum 1', and a support 4' for supporting the drum 1'. The drum 1' is mounted on a rack 4', and the feed part 2' is higher than the discharge part 3'. The drum 1' can rotate continuously clockwise or counterclockwise along a central axis thereof. A plurality of shoveling plates 5' are uniformly distributed and fixed on an inner wall 11' of the drum 1', and each shoveling plate runs axially from the feed end of the drum 1' through the drum to the discharge end, and each plate is parallel to the central axis of the drum 1'. Tobacco shreds are fed from the feed part 2' into the drum 1', and under the rotation of the drum 1' together with the action of the shoveling plate 5', are tumbled up and down with the drum 1' and the shoveling plate 5' and thrown thereby and spirally travel. The tobacco shreds are flavored by the spraying device 6' during traveling, and the flavored tobacco shreds are discharged from the discharge part 3' and conveyed to the next process. The spraying device 6' continuously applies a liquid flavor to the tobacco shreds being thrown. A spraying direction of the spraying device 6' is oriented toward the inner wall 11' of the drum 1' at a position spaced from a feed port of the drum 1' by about one-third of the length of the drum. The tobacco shreds are tumbled up and down and stirred under the rotation of the drum 1' together with the action of the shoveling plate 5' so that the liquid flavor is absorbed evenly to accomplish the task of the flavoring process.

The flavoring device in the prior art has at least the following problems.

1. Due to a low water content of the tobacco shreds in the flavoring process, a breeze can blow the tobacco shreds. The spraying device 6' is installed at a front end of the feed part 2' and the applied liquid flavor is sprayed from the feed part 2' toward the discharge part 3', such that the liquid flavor and part of the tobacco shreds are blown directly to the discharge part 3' at a tail end of the drum under a spraying pressure of the spraying device and are adsorbed on the discharge part 3', resulting in waste of tobacco shreds and generation of wet clusters, thus affecting product quality.
2. The atomized liquid flavor from the existing spraying device sweeps on the surfaces of the tobacco shreds, and the spraying device 6' has a small spray cone angle Φ, leading to a large impact force on and a small contact area with the tobacco shreds, which is not conducive to absorption by the tobacco shreds, such that the liquid flavor stays on the surfaces of the tobacco shreds or volatilizes in internal and external environments of the drum 1', resulting in low flavoring uniformity, a low utilization rate of the liquid flavor, and environmental pollution.
3. The shoveling plate 5' is designed as a flat plate from the feed end to the discharge end of the drum 1' and is parallel to the central axis of the drum 1'. At the feed end, the tobacco shreds are liable to be thrown back to a feed vibrating trough (not shown in the figures) and vibrated repeatedly therein, causing breakage of the tobacco shreds; and at the discharge end, after flavored in a nozzle spraying area, the tobacco shreds are tumbled up and down with the shoveling plate in the drum 1' and thrown thereby for too long, causing the tobacco shreds to be broken by excessive throwing. In addition, the shoveling plate has a poor throwing and loosening effect, such that the tobacco shreds are thrown in piles and form a small contact area with the atomized liquid flavor, which is not conducive to the absorption of the liquid flavor by the tobacco shreds.
4. Due to a poor effect of overall absorption of the atomized liquid flavor by the tobacco shreds, a large amount of liquid flavor spills over from the feed port, a discharge port and a moisture removal system, leading to low utilization efficiency of volatile substances especially, resulting in deviation from the initial design of a product in smell intensity and aroma coordination stability.

SUMMARY OF THE DISCLOSURE

The present disclosure aims to provide a tobacco flavoring machine to improve the problem of the related art that tobacco shreds cannot flow smoothly from an inlet end toward an outlet end because a shoveling plate is parallel to an axis of a drum.

According to an aspect of an embodiment of the present disclosure, a tobacco flavoring machine is provided, the tobacco flavoring machine including:
a drum capable of rotating about an axis thereof as a rotation center;
a nozzle disposed in the drum to spray a liquid flavor to tobacco shreds in the drum; and
a shoveling plate arranged on an inner wall of the drum and extending from an inlet end of the drum towards the interior of the drum, the shoveling plate being disposed obliquely with respect to a generatrix of the drum.

In some embodiments, the shoveling plate includes:
a first shoveling plate extending from the inlet end of the drum towards the interior of the drum; and
a second shoveling plate disposed side by side with the first shoveling plate along axis of drum and located inwardly relative to the first shoveling plate, an included angle between the second shoveling plate and the generatrix of the drum being smaller than an included angle between the first shoveling plate and the generatrix of the drum.

In some embodiments, the nozzle faces the second shoveling plate to spray the liquid flavor to tobacco shreds thrown down by the second shoveling plate.

In some embodiments, the shoveling plate further includes a third shoveling plate disposed at an end of the second shoveling plate away from the first shoveling plate, the distance between an end of the third shoveling plate away from the inner wall of the drum and the inner wall being larger than the distance between an end of the second shoveling plate away from the inner wall and the inner wall to block tobacco sheds moving towards an outlet end of the drum under the impact of the liquid flavor and/or the liquid flavor.

In some embodiments, the distance between the top of an end of the third shoveling plate close to the second shoveling plate and the inner wall is smaller than the distance between the top of an end of the third shoveling plate away from the second shoveling plate and the inner wall.

In some embodiments, the shoveling plate further includes a fourth shoveling plate located downstream of the second shoveling plate along a flow direction of the tobacco shreds, the fourth shoveling plate being configured to stir the tobacco shreds added with the liquid flavor.

In some embodiments, an included angle between the fourth shoveling plate and the generatrix is smaller than the included angle between the first shoveling plate and the generatrix.

In some embodiments, the shoveling plate further includes a fifth shoveling plate located in the drum close to an outlet end of the drum, an included angle between the fifth shoveling plate and the generatrix being larger than the included angle between the second shoveling plate and the generatrix.

In some embodiments, an end of the shoveling plate adjacent to the inlet end of the drum is located downstream of the other end of the shoveling plate in the direction of rotation of the drum.

In some embodiments, at least one of a spray angle, a spray cone angle and a spray distance of the nozzle is adjustable.

In some embodiments, the tobacco flavoring machine further includes a protective cover provided on the nozzle.

By adopting the technical solution of the present disclosure, in which the shoveling plate is arranged on the inner wall of the drum and extends from the inlet end of the drum towards the interior of the drum, and the shoveling plate is disposed obliquely with respect to the generatrix of the drum, the problem of the related art that tobacco shreds cannot flow smoothly from an inlet end toward an outlet end because a shoveling plate is parallel to an axis of a drum is improved.

Other features and advantages of the present disclosure will become apparent from the following detailed description of exemplary embodiments of the present disclosure with reference to the accompanying drawings.

BRIEF DESCRIPTION OF THE ACCOMPANYING DRAWINGS

To describe technical solutions in the embodiments of the present disclosure or in the related art more clearly, the drawings to be used in description of the embodiments or the related art will be introduced briefly below. Obviously, the drawings in the following description only represent some embodiments of the present disclosure, and those of ordinary skill in the art can also obtain other drawings based on these drawings without creative work.

REFERENCE NUMERALS

1'—Drum; 11'—Inner wall; 2'—Feed hood; 3'—Discharge hood; 4'—Rack; 5'—Shoveling plate; 6'—Spraying device;

1—Drum; 11—Inner wall; 2—Feed hood; 3—Discharge hood; 4—Rack; 5—Shoveling plate; 51—First shoveling plate; 52—Second shoveling plate; 53—Third shoveling plate; 54—Fourth shoveling plate; 55—Fifth shoveling plate; 6—Nozzle; 7—Protective cover; 8—Nozzle holder; 9—Generatrix.

DETAILED DESCRIPTION OF THE PREFERRED EMBODIMENTS

The technical solutions in the embodiments of the present disclosure will be described below clearly and completely in conjunction with the accompanying drawings in the embodiments of the present disclosure. Obviously, the described embodiments are only a part of the embodiments of the present disclosure, and not all the embodiments. The following description of at least one exemplary embodiment is actually only illustrative, and in no way serves as any limitation on the present disclosure and its application or use. All other embodiments obtained by those of ordinary skill in the art without creative work, based on the embodiments in the present disclosure, should fall into the protection scope of the present disclosure.

Figure 4:
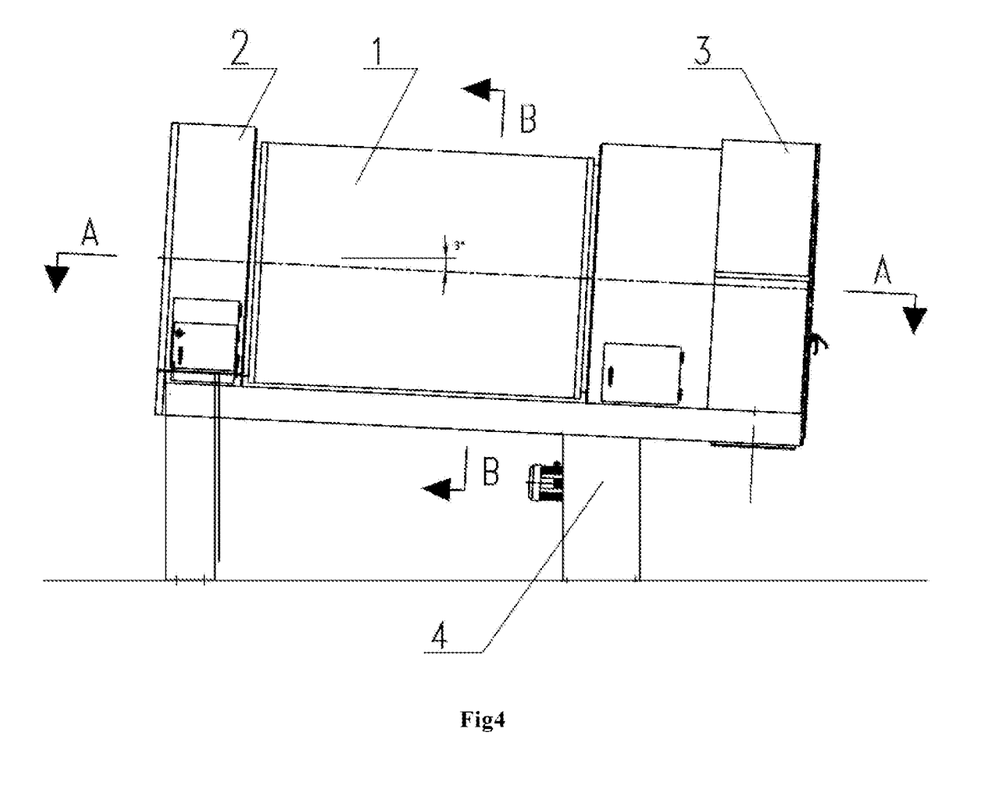
FIG. 4 shows a schematic structural diagram of a tobacco flavoring machine of an embodiment of the present disclosure.
Figure 5:
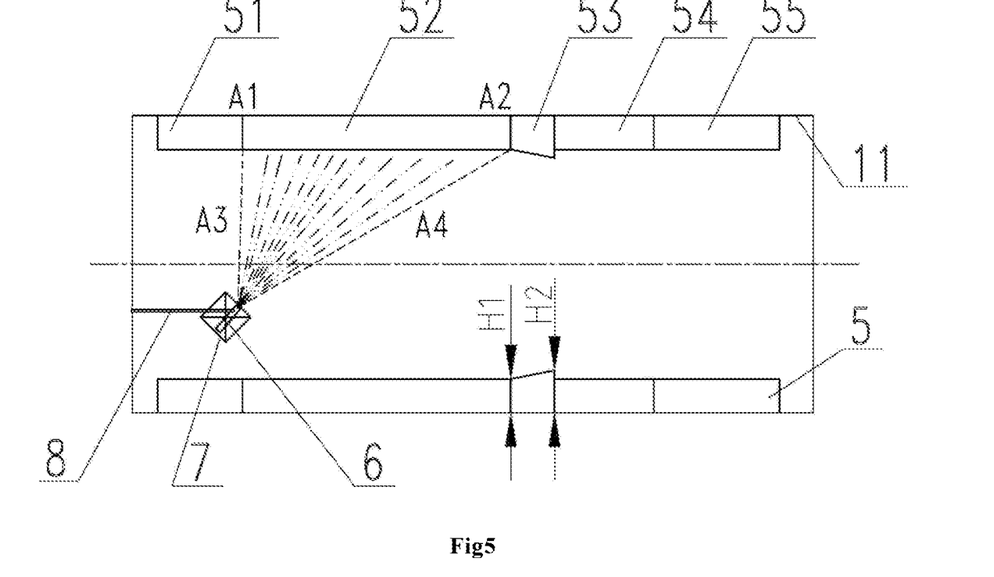
FIG. 5 shows a schematic structural diagram of a cross section at A-A of a drum of the tobacco flavoring machine in FIG. 4.
Figure 6:
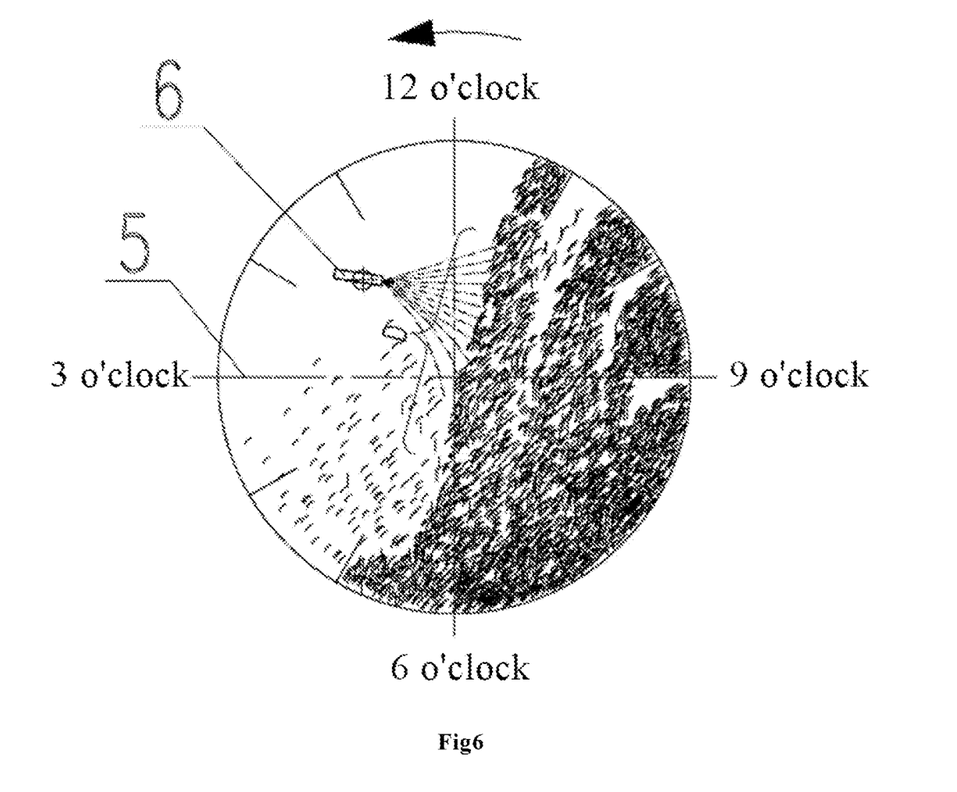
FIG. 6 shows a schematic structural diagram of a cross section at B-B of the drum of the tobacco flavoring machine in FIG. 4.
Figure 7:
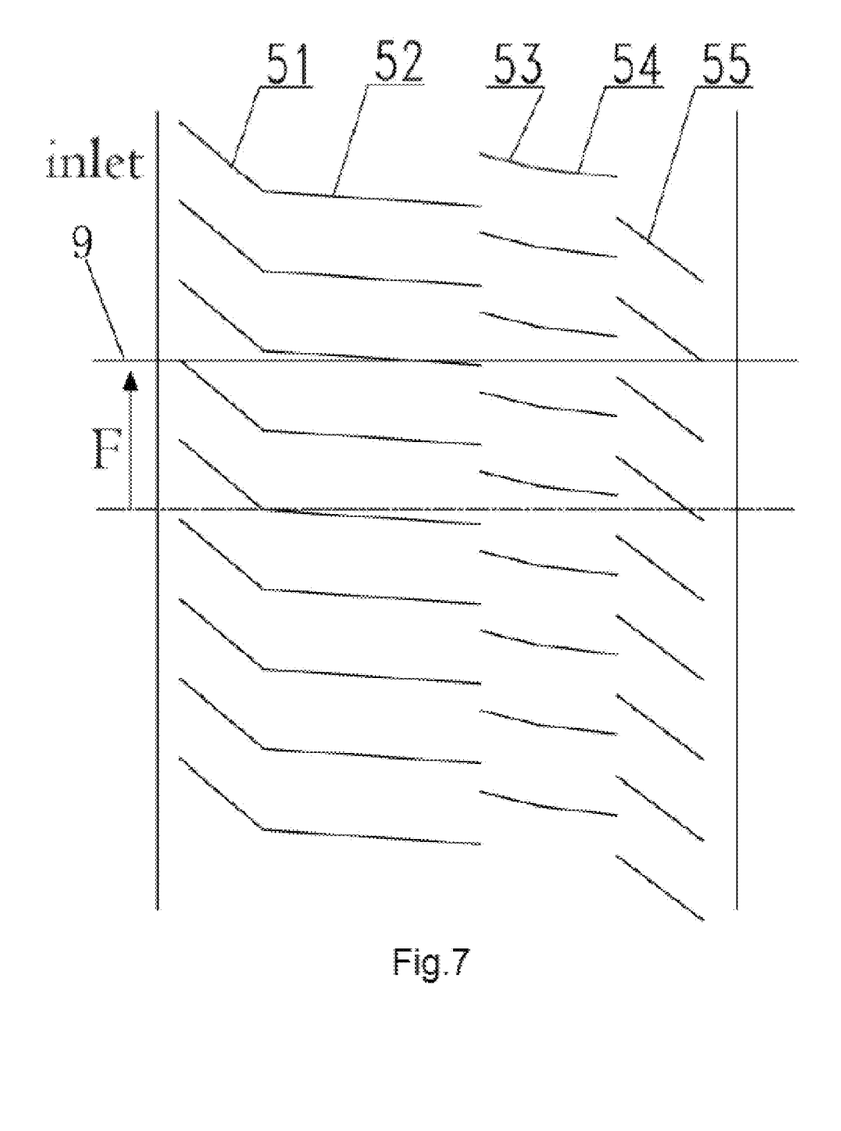
FIG. 7 shows an internal deployed diagram of the drum of the tobacco flavoring machine of the embodiment of the present disclosure.

FIG. 4 shows a schematic structural diagram of a tobacco flavoring machine of the embodiment; FIG. 5 shows a schematic structural diagram of a cross section at A-A of a drum of the tobacco flavoring machine in FIG. 4 of the embodiment; and FIG. 6 shows a schematic structural diagram of a cross section at B-B of the drum of the tobacco flavoring machine in FIG. 4. FIG. 7 shows a schematic structural diagram after deployment of the drum of the tobacco flavoring machine of the embodiment.

Referring to FIGS. 4 to 7, the tobacco flavoring machine of this embodiment includes a drum 1, a nozzle 6, and a shoveling plate 5. The drum 1 is capable of rotating about an axis thereof as a rotation center; the nozzle 6 is disposed in the drum 1 to spray a liquid flavor to tobacco shreds in the drum 1; and the shoveling plate 5 is arranged on an inner wall 11 of the drum 1 and extends from an inlet end of the drum 1 towards the interior of the drum 1, the shoveling plate 5 being disposed obliquely with respect to a generatrix 9 of the drum 1.

As shown in FIG. 6, when the shoveling plate 5 rotates to a direction of 9 o'clock, an end of the shoveling plate 5 close to the inlet end of the drum 1 is higher than the other end of the shoveling plate 5, so the tobacco shreds can be thrown down in sequential order along the shoveling plate 5 towards an outlet end of the drum 1, thus improving the problem that tobacco shreds on a same shoveling plate are synchronously thrown down at the same time from an inlet end to an outlet end in the related art.

In this embodiment, the shoveling plate 5 includes a first shoveling plate 51 and a second shoveling plate 52. The first shoveling plate 51 extends from the inlet end of the drum 1 towards the interior of the drum 1.

The second shoveling plate 52 is disposed side by side with the first shoveling plate 51 along axis of drum 1 and located inwardly relative to the first shoveling plate 51, an included angle between the second shoveling plate 52 and the generatrix 9 of the drum 1 being smaller than an included angle between the first shoveling plate 51 and the generatrix of the drum 1.

The included angle between the first shoveling plate 51 and the generatrix 9 of the drum 1 is 30° to 60°. The generatrix 9 of the drum 1 is parallel to the axis of the drum 1, so an angle between the first shoveling plate 51 and the axis of the drum 1 is also 30° to 60°.

The included angle between the second shoveling plate 52 and the generatrix 9 of the drum 1 is 3° to 10°.

The nozzle 5 faces the second shoveling plate 52 to spray the liquid flavor to tobacco shreds thrown by the second shoveling plate 52.

The shoveling plate 5 further includes a third shoveling plate 53 disposed at an end of the second shoveling plate 52 away from the first shoveling plate 51, the distance between an end of the third shoveling plate 53 away from the inner wall 11 and the inner wall 11 being larger than the distance between an end of the second shoveling plate 52 away from the inner wall 11 and the inner wall 11 to block tobacco sheds moving towards the outlet end of the drum 1 under the impact of the liquid flavor and/or the liquid flavor.

The distance between the top of an end of the third shoveling plate 53 close to the second shoveling plate 52 (the top is the end away from the inner wall) and the inner wall 11 is smaller than the distance between the top of an end of the third shoveling plate 53 away from the second shoveling plate 52 (the top is the end away from the inner wall) and the inner wall 11. That is, a height H1 of a front segment of the third shoveling plate 53 is smaller than a height H2 of a rear end thereof.

The shoveling plate 5 further includes a fourth shoveling plate 54 located downstream of the second shoveling plate 52 along a flow direction of the tobacco shreds, the fourth shoveling plate 54 being configured to stir the tobacco shreds added with the liquid flavor.

An included angle between the fourth shoveling plate 54 and the generatrix 9 is smaller than the included angle between the first shoveling plate 51 and the generatrix 9.

The shoveling plate 5 further includes a fifth shoveling plate 55 located in the drum 1 close to the outlet end of the drum 1, an included angle between the fifth shoveling plate 55 and the generatrix 9 being larger than the included angle between the second shoveling plate 52 and the generatrix 9. An included angle between the fifth shoveling plate 55 and the axis of the drum 1 is also 30° to 60°.

The end of the shoveling plate 5 adjacent to the inlet end of the drum 1 is located downstream of the other end of the shoveling plate 5 in the direction of rotation of the drum 1. As shown in FIG. 7, an arrow F in the figure denotes the rotation direction of the drum 1. The rotation direction is configured such that the bottommost shoveling plate 5 of the drum 1 can reach the position of 9 o'clock shown in FIG. 6 by rotating 90 degrees, which is conducive to conveying the tobacco shreds introduced at the inlet end of the drum 1 towards a discharge end, as well as conducive to completing throwing down of the tobacco shreds before rotating to the position of 12 o'clock.

The tobacco flavoring machine includes a drum 1 and a shoveling plate 5 disposed on an inner wall 11 of the drum, wherein the shoveling plate 5 is at least composed of a first shoveling plate 51, a second shoveling plate 52, a third shoveling plate 53, a fourth shoveling plate 54 and a fifth shoveling plate 55; the first shoveling plate 51, the second shoveling plate 52, the third shoveling plate 53, the fourth shoveling plate 54 and the fifth shoveling plate 55 are arranged successively in the drum 1 from the front to the rear end; and the shoveling plate 5 is fixed on the inner wall 11.

Further, the first shoveling plate 51 is a fast-feeding area, the second shoveling plate 52 is a flavoring area, the third shoveling plate 53 is a blocking area, the fourth shoveling plate 54 is a tobacco shred stirring and blending area, and the fifth shoveling plate 55 is a fast-discharging area.

Further, the number of plates in the drum 1 is greater than 6 and the plates are evenly distributed around the circumference.

Further, a width H1 of a front segment of the third shoveling plate 53 is smaller than a width H2 of a rear end thereof.

Preferably, an included angle between the shoveling plate 5 and the inner wall 11 is 70° to 110°.

Preferably, a rotation speed of the drum 1 is adjustable between 6 to 15 r/min in a variable frequency manner.

Based on this, the first shoveling plate 51 enables the fed tobacco shreds to be quickly conveyed to the flavoring area after entering the drum 1 to reduce excessive throwing and breakage of the tobacco shreds and avoid spillover of the tobacco shreds at the feed end of the drum; the second shoveling plate 52 enables the tobacco shreds conveyed from the first shoveling plate 51 to be thrown continuously and evenly to increase the throwing uniformity and throwing area of the tobacco shreds and ensure gaps between tobacco particles; the third shoveling plate 53 blocking area blocks the tobacco shreds and liquid flavor blown axially to the discharge end by a spray pressure, and the tobacco shreds thrown by the blocking area absorb the atomized liquid flavor blown axially toward the discharge end, to avoid adsorption of the tobacco shreds and liquid flavor on a discharge hood 3 and/or volatization of the liquid flavor into internal and external environments of the drum 1, thereby reducing environmental pollution of the flavoring process; the fourth shoveling plate 54 further tumbles, stirs and blends the flavored tobacco shreds to improve the flavoring uniformity and absorption rate of the flavored tobacco shreds; the fifth shoveling plate 55 allows the fully tumbled and blended tobacco shreds to leave the drum 1 quickly and enter the next process to avoid excessive tumbling and throwing of the tobacco shreds and reduce breakage of the tobacco shreds, and also blocks the tobacco shreds thrown down by the fourth shoveling plate 54 to reduce spillover of flying tobacco shreds when the tobacco shreds are thrown down and collide with the inner wall.

Further, an included angle between the first shoveling plate 51 and a midline axis of the drum 1, and an included angle between the fifth shoveling plate 55 and the midline axis are 30° to 60°, and the shoveling plate 5 is high in front and low in back when the shoveling plate is at the position of 9 o'clock.

Based on this, when the first shoveling plate 51 and the fifth shoveling plate 55 rotate to the position of 9 o'clock, all the tobacco shreds thereon can slide from the feed end toward the discharge end through upper surfaces of the shoveling plates, to avoid breakage and flying of the tobacco shreds when the tobacco shreds are brought to too high a position by a tobacco shred shoveling device and then fall.

Further, an included angle between the second shoveling plate 52 and the midline axis of the drum 1 is 3° to 10°, and the shoveling plate 5 is high in front and low in back when the shoveling plate is at the position of 9 o'clock.

Based on this, as the drum 1 rotates, the tobacco shreds on an upper surface of the second shoveling plate 52 are thrown down in sequential order. That is, for the tobacco shreds on the second shoveling plate 52, the tobacco shreds at the front end are thrown first, then the tobacco shreds at other positions are thrown in a sequence toward the rear end, and the tobacco shreds at the rear end are thrown last, so that the throwing and blending of the tobacco shreds are more continuous and uniform, and tobacco shreds in contact with the liquid flavor are prevented from being too concentrated, thus improving the uniformity of flavoring.

Another aspect of the present disclosure further discloses a spraying device including a nozzle 6 and a nozzle holder 8, the nozzle 6 being disposed inside the drum 1.

Further, the nozzle holder 8 is fixed to a front end of the feed hood 2 and extends from the front end into the drum 1.

Preferably, a spray cone angle of the nozzle 6 is 30° to 60°.

Further, a spray distance of the nozzle 6 is at a position where tobacco shreds are thrown down from the second shoveling plate 52 as a liquid flavor atomization area.

Further, a spray angle, the spray cone angle and the spray distance of the nozzle 6 are adjustable.

Based on this, the angle between the nozzle and the central axis of the drum is increased as much as possible to reduce a spraying partial pressure of the nozzle toward the rear end of the drum and increase a spraying partial pressure of the nozzle toward the tobacco shreds, so as to reduce spillover of the tobacco shreds and the atomized liquid flavor, and increase the rate of absorption of the atomized liquid flavor by the tobacco shreds; and by increasing the spray cone angle of the nozzle, the contact area between the tobacco shreds and the atomized liquid flavor is increased, to improve the uniformity of the absorption of the liquid flavor by the tobacco shreds.

Further, a protective cover 7 is mounted above the nozzle 6.

Based on this, it avoids hanging of the tobacco shreds on the nozzle 6 and the nozzle holder 8 during the throwing process, and avoids affecting the atomization effect of the liquid flavor by a large amount of tobacco shreds hung at the nozzle and avoids producing wet clusters of tobacco shreds due to staying of some tobacco shreds at the nozzle for too long time.

Preferably, the nozzle 6 has a liquid flavor applying pressure of less than 1.0 bar, and an ejecting medium pressure between 0.5 bar and 2 bar.

Based on this, the atomized particle size of the liquid flavor is larger than 40 microns and smaller than 200 microns, which is conducive to the absorption of the liquid flavor by the tobacco shreds. Furthermore, a relatively small pressure is used to atomize and spray the liquid flavor, to avoid turbulence of the environment inside the drum due to too much impact on the tobacco shreds during the liquid flavor spraying process, and reduce tobacco shreds and atomized liquid flavor flying around.

Further, an included angle between A3 and a centerline of a discharge direction of the drum 1 is smaller than 90°.

Based on this, the liquid flavor spraying pressure pushes the tobacco shreds to travel in the discharge direction, to avoid adsorption of the tobacco shreds and atomized liquid flavor on the feed hood due to backflow thereof.

Preferably, the tobacco flavoring machine 2 is not equipped with a moisture removal system.

A method of using the drum-type flavoring machine with the tobacco shred shoveling device and the spraying device based on the above embodiment will be described below in detail.

(1) The rotation speed of the drum 1 is adjusted so that the material falls at positions between 9 and 12 o'clock in the drum, i.e., the tobacco shreds start to be thrown down when the second shoveling plate 52 rotates to the position of 9 o'clock, and the throwing down of the tobacco shreds is finished before rotation to 12 o'clock;

(2) the center orientation of the nozzle 6 is adjusted so that it faces a middle region of the axial direction of the second shoveling plate 52;

(3) with a connecting line between the first shoveling plate 51 and the second shoveling plate 52 being A1, a connecting line between the second shoveling plate 52 and the third shoveling plate 53 being A2, a connecting line between a nozzle exit of the nozzle 6 and A1 being A3, and a connecting line between the nozzle exit of the nozzle 6 and A2 being A4, the pressure of the liquid flavor and/or the pressure of the ejecting medium is adjusted so that a spraying range of the nozzle 6 is between A3 and A4; and (4) the spray cone angle and spray direction of the nozzle are adjusted according to a liquid flavor applying flow rate, a liquid flavor applying pressure and a liquid flavor ejecting pressure in normal production, so that the liquid flavor atomization area is within a tobacco shred throwing and loosening area D to avoid spraying the liquid flavor onto the inner wall 11 of the drum 1.

Based on the above method, firstly, the tobacco shreds are thrown more loosely, which increases the throwing area; secondly, the liquid flavor atomization area overlaps the material throwing and loosening area of the second shoveling plate 52, which increases the mass transfer area between the tobacco shreds and the liquid flavor, improve the absorption rate and absorption uniformity of the liquid flavor by the tobacco shreds, and reduce environmental pollution and raw material waste caused by spillover of the liquid flavor; and finally, the forward impact of the liquid flavor spraying is blocked by the tobacco shreds in the third shoveling plate 53 blocking area, which avoids the waste of raw material and the generation of wet clusters of tobacco due to the tobacco shreds and atomized liquid flavor being pushed to the discharge end and adsorbed to the inner wall of the equipment.

Described above are only exemplary embodiments of the present disclosure, which are not intended to limit the present disclosure, and all modifications, equivalent substitutions and improvements made within the spirit and principle of the present disclosure should be encompassed within the protection scope of the present disclosure.

We claim:

1. A tobacco flavoring machine, comprising:
a drum, rotatable about an axis thereof as a rotation center;
a nozzle, disposed in the drum to spray a liquid flavor to tobacco shreds in the drum; and
a shoveling plate, arranged on an inner wall of the drum and extending from an inlet end of the drum towards an interior of the drum, the shoveling plate being disposed obliquely with respect to a generatrix parallel to the axis of the drum,
wherein the shoveling plate comprises:
a first shoveling plate, extending from the inlet end of the drum towards the interior of the drum; and
a second shoveling plate disposed side by side with the first shoveling plate along an axis of drum and located inwardly relative to the first shoveling plate, the second shoveling plate being connected to the first shoveling plate, an included angle between the second shoveling plate and the generatrix of the drum being smaller than an included angle between the first shoveling plate and the generatrix of the drum,
wherein the nozzle faces the second shoveling plate to spray the liquid flavor to tobacco shreds thrown down by the second shoveling plate,
wherein the shoveling plate further comprises a third shoveling plate disposed at an end of the second shoveling plate away from the first shoveling plate, a distance between an end of the third shoveling plate away from the inner wall of the drum and the inner wall being larger than a distance between an end of the second shoveling plate away from the inner wall and the inner wall to block tobacco sheds moving towards an outlet end of the drum under impact of the liquid flavor and/or the liquid flavor,
wherein the distance between a top of an end of the third shoveling plate close to the second shoveling plate and the inner wall is smaller than the distance between the top of an end of the third shoveling plate away from the second shoveling plate and the inner wall.

2. The tobacco flavoring machine according to claim 1, wherein the shoveling plate further comprises a fourth shoveling plate located downstream of the second shoveling plate along a flow direction of the tobacco shreds, the fourth shoveling plate being configured to stir the tobacco shreds added with the liquid flavor.

3. The tobacco flavoring machine according to claim 2, wherein an included angle between the fourth shoveling plate and the generatrix is smaller than the included angle between the first shoveling plate and the generatrix.

4. The tobacco flavoring machine according to claim 1, wherein the shoveling plate further comprises a fifth shoveling plate located in the drum close to an outlet end of the drum, an included angle between the fifth shoveling plate and the generatrix being larger than the included angle between the second shoveling plate and the generatrix.

5. The tobacco flavoring machine according to claim 1, wherein an end of the shoveling plate adjacent to the inlet end of the drum is located downstream of the other end of the shoveling plate in the direction of rotation of the drum.

6. The tobacco flavoring machine according to claim 1, wherein at least one of a spray angle, a spray cone angle and a spray distance of the nozzle is adjustable.

7. The tobacco flavoring machine according to claim 1, further comprising a protective cover provided on the nozzle.

* * * * *